United States Patent [19]
Kishi et al.

[11] Patent Number: 5,546,160
[45] Date of Patent: Aug. 13, 1996

[54] AUTOMATIC FILM FEEDER

[75] Inventors: Takuji Kishi; Kimiharu Ohtani, both of Wakayama, Japan

[73] Assignee: Noritsu Koki Co., Ltd., Wakayama, Japan

[21] Appl. No.: 404,767

[22] Filed: Mar. 15, 1995

[30] Foreign Application Priority Data

Mar. 16, 1994 [JP] Japan ..................... 6-045872

[51] Int. Cl.$^6$ ................ G03B 27/48; G03B 27/50; G03B 27/32; G03B 27/52
[52] U.S. Cl. ................ 355/50; 355/27; 355/40; 355/72
[58] Field of Search ................ 355/27, 28, 29, 355/40, 41, 75, 76, 50, 72; 354/6

[56] References Cited

U.S. PATENT DOCUMENTS 5,181,066  1/1993  Ozawa et al. .

FOREIGN PATENT DOCUMENTS 0423810  4/1991  European Pat. Off. .
0543069  5/1993  European Pat. Off. .

Primary Examiner—Arthur T. Grimley
Assistant Examiner—Herbert V. Kerner
Attorney, Agent, or Firm—Wenderoth, Lind & Ponack

[57] ABSTRACT

An automatic film feeder has an arrangement with which films can be reversed manually to reposition the frames of each film. A film magazine is mounted outside of an outer case of the printing machine. Films fed from the film magazine are guided into a film feed passage provided inside the outer case by means of a film guide. The film guide has a loop guide which is openably mounted. When a film is fed backward, it slackens and opens the loop guide forcibly.

19 Claims, 7 Drawing Sheets

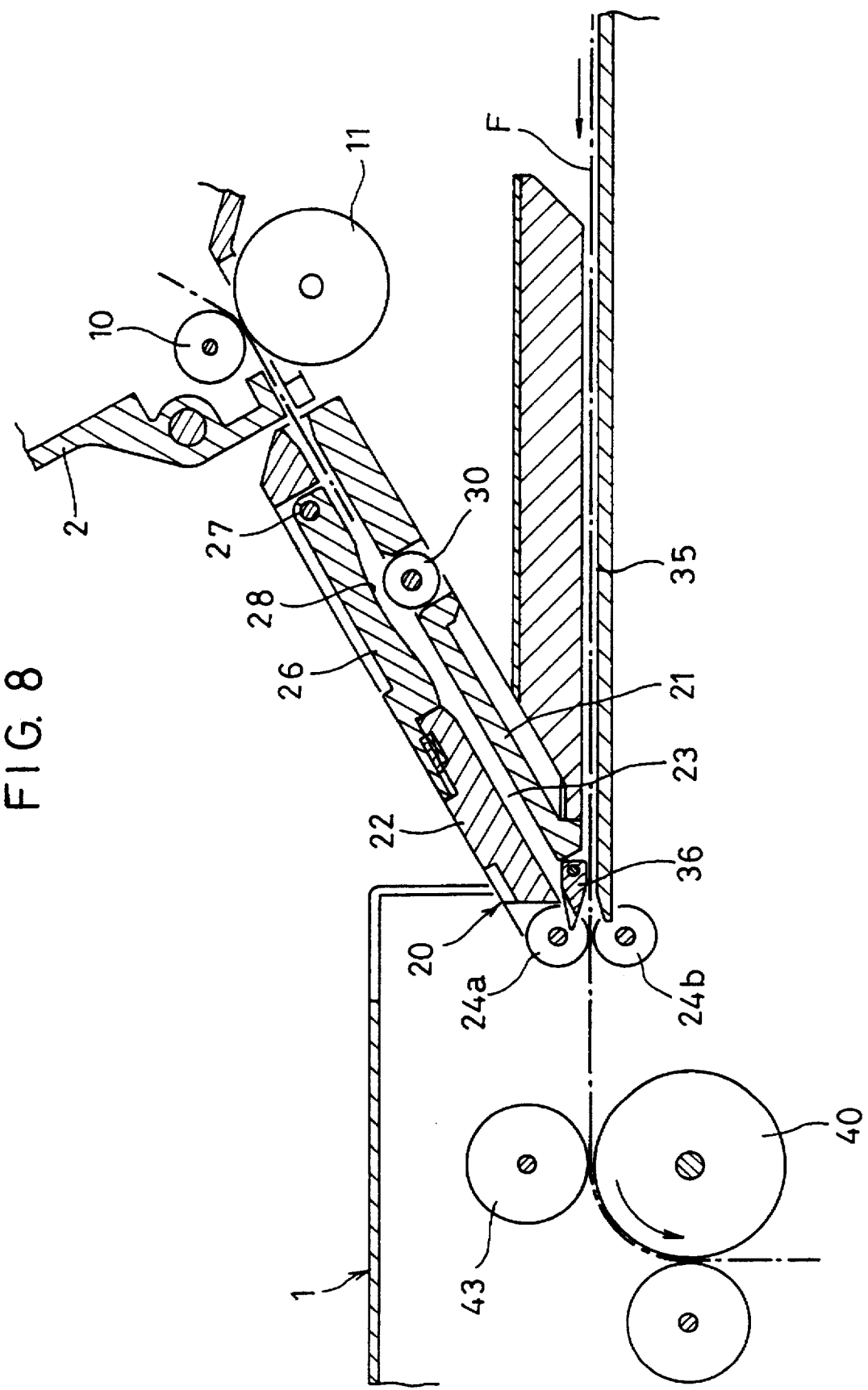

AUTOMATIC FILM FEEDER

BACKGROUND OF THE INVENTION

This invention relates to an automatic film feeder for feeding developed films into a photographic printing machine to an exposure position thereof.

To print photographic films, it is usually necessary to detect the image information for each frame of the film at a scanner unit and feed the film into the exposure station. In printing, the quantity of light is adjusted on the basis of detected image information.

There are two known methods of feeding developed films into the printing machine. One is to manually feed film strips one by one. The other is to automatically feed a plurality of films after winding them in a roll.

The former method has a problem in that films cannot be printed efficiently enough.

The latter method has the following drawbacks.

Positioning of a film is carried out by detecting the position of the blank portions between the adjacent image-carrying frames of a film when detecting image information for each frame. But not all the frames are distinguishable from the adjacent frames. If a film has a frame having a portion undistinguishable from the adjacent blank portions, no exact positioning of the film is possible. Thus, the film has to be manually pulled back and fed forward again for repositioning When a film is fed backward in the feeder, it necessarily slackens. Thus, in order to feed the film backward, a space is necessary for the film to slacken in the feeder. But none of the conventional automatic film feeders has such space, so that it was impossible to feed films backward for repositioning of an undetectable frame.

An object of this invention is to provide a film feeder which makes it possible to feed a film backward for repositioning of any frame which is not detectable at the scanner unit.

SUMMARY OF THE INVENTION

According to this invention, there is provided an automatic film feeder comprising a film magazine detachably mounted on an outer case of a printing machine and having a core around which a plurality of films are wound, a feed roller for feeding the plurality of films out of the film magazine one by one, a film guide for guiding films fed out of the film magazine into a film feed path provided inside the outer case, and carrier rollers for feeding films fed into the film feed path to a scanner unit and then to an exposure unit, characterized in that the film guide has a loop guide adapted to be opened by being pushed by a slackened portion of a film which is formed when the film is fed backward.

The film guide may comprise a lower guide plate and an upper guide plate provided over the lower guide plate so as to define a film passage between the upper and lower guide plates, the upper guide plate being formed with a window, the loop guide being mounted in the window, the loop guide having its rear end, with respect to the direction in which films are fed, pivotally supported.

A magnet is mounted on one of the upper guide plate and the loop guide and a metal piece is mounted on the other, so that the loop guide will be attracted to the upper guide plate at leading end of the loop guide.

In order to ensure that the film forms a loop at the loop guide, the guide has on inner surface thereof a concavely curved surface, and wherein the lower guide plate rotatably carries a loop guide roller located opposite to the curved surface with part of its outer periphery protruding into the film passage.

With this arrangement, when a film is fed backward by reversing the carrier rollers, with its rear end caught by the feed roller, the film slackens in the film guide, so that the loop guide is raised and opened by the slackened portion of the film. Thus, a space is formed which allows the formation of a loop, so that the film can be fed backward.

By forming a concavely curved surface on the inner surface of the loop guide and providing a loop guide roller under the curved surface to guide the film along the curved surface, the film slackens along the curved surface when fed backward.

Other features and objects of the present invention will become apparent from the following description made with reference to the accompanying drawings, in which:

BRIEF DESCRIPTION OF THE DRAWINGS

FIG. 8 is a sectional view showing how an extra film is inserted into the film feed line.

DETAILED DESCRIPTION OF THE PREFERRED EMBODIMENT

Now, an embodiment of this invention is described with reference to the accompanying drawings.

Figure 1:
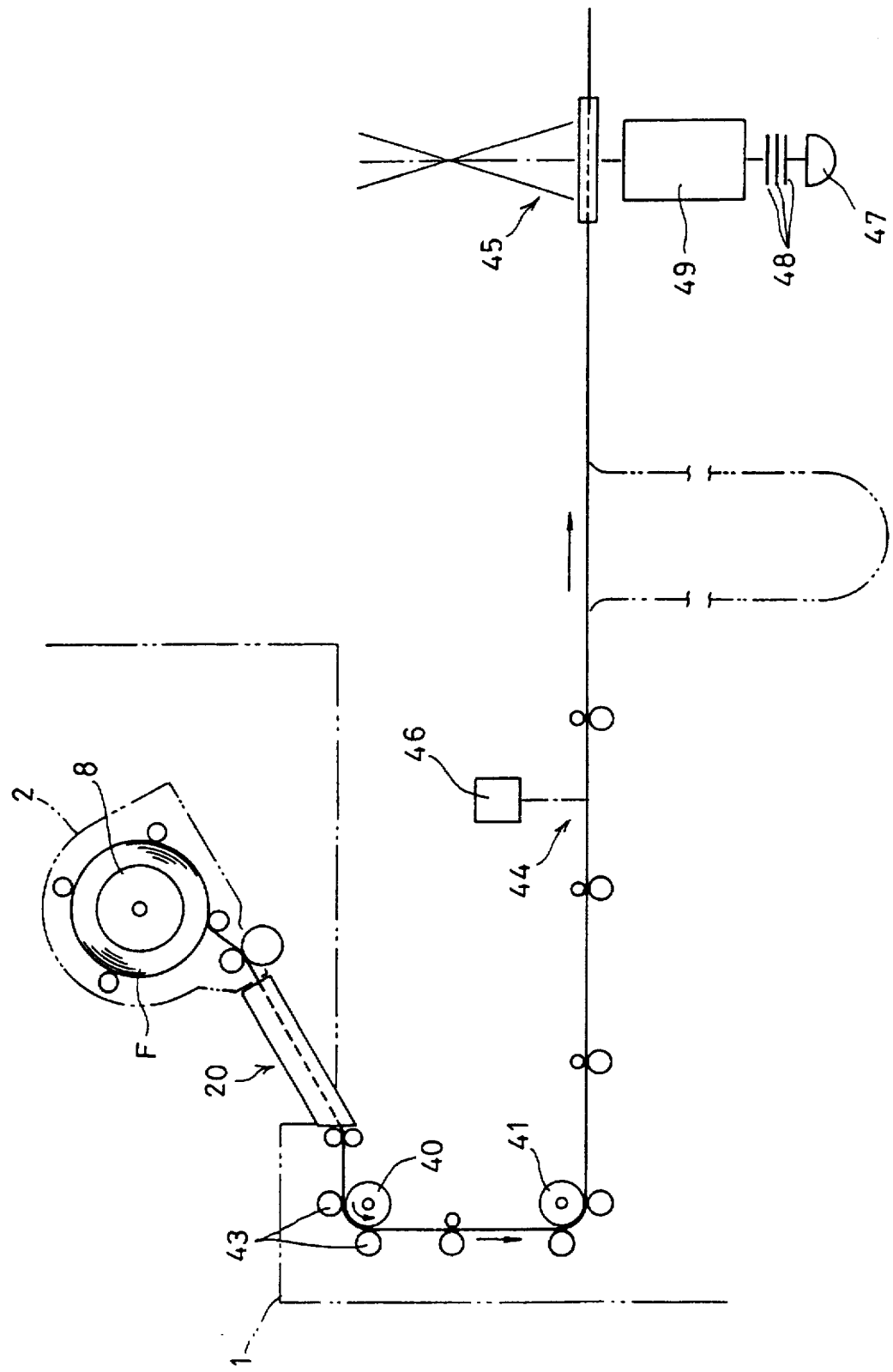
FIG. 1 is a schematic view of an automatic film feeder according to this invention.

FIG. 1 schematically shows the automatic film feeder of the preferred embodiment. A film magazine 2 is provided outside an outer case 1 of a printing unit. Films F are rolled out of the film magazine 2 and fed through a film guide 20 into a film feed path provided inside the outer case 1. A first carrier roller 40 and a second carrier roller 41 are provided along the film feed path.

Surrounding each of the first carrier roller 40 and the second carrier roller 41 are a plurality of pressure rollers 43 for pressing films F against the rollers 40 and 41. The first and the second carrier rollers 40, 41 are rotated in both directions by an unillustrated motor. By rotating them in a forward direction, films F are fed from a scanner unit 44 toward an exposure unit 45.

The scanner unit 44 includes a color scanner 46 for detecting image information for each frame of a film F. On the other hand, the exposure unit 45 has a light source 47, light modulation filters 48 and a mirror tunnel 49. The light from the light source 47 is projected on the film F through the filters 48 and mirror tunnel 49 to print the images on the film F onto a photosensitive material through a printing lens (not shown).

Figure 2:
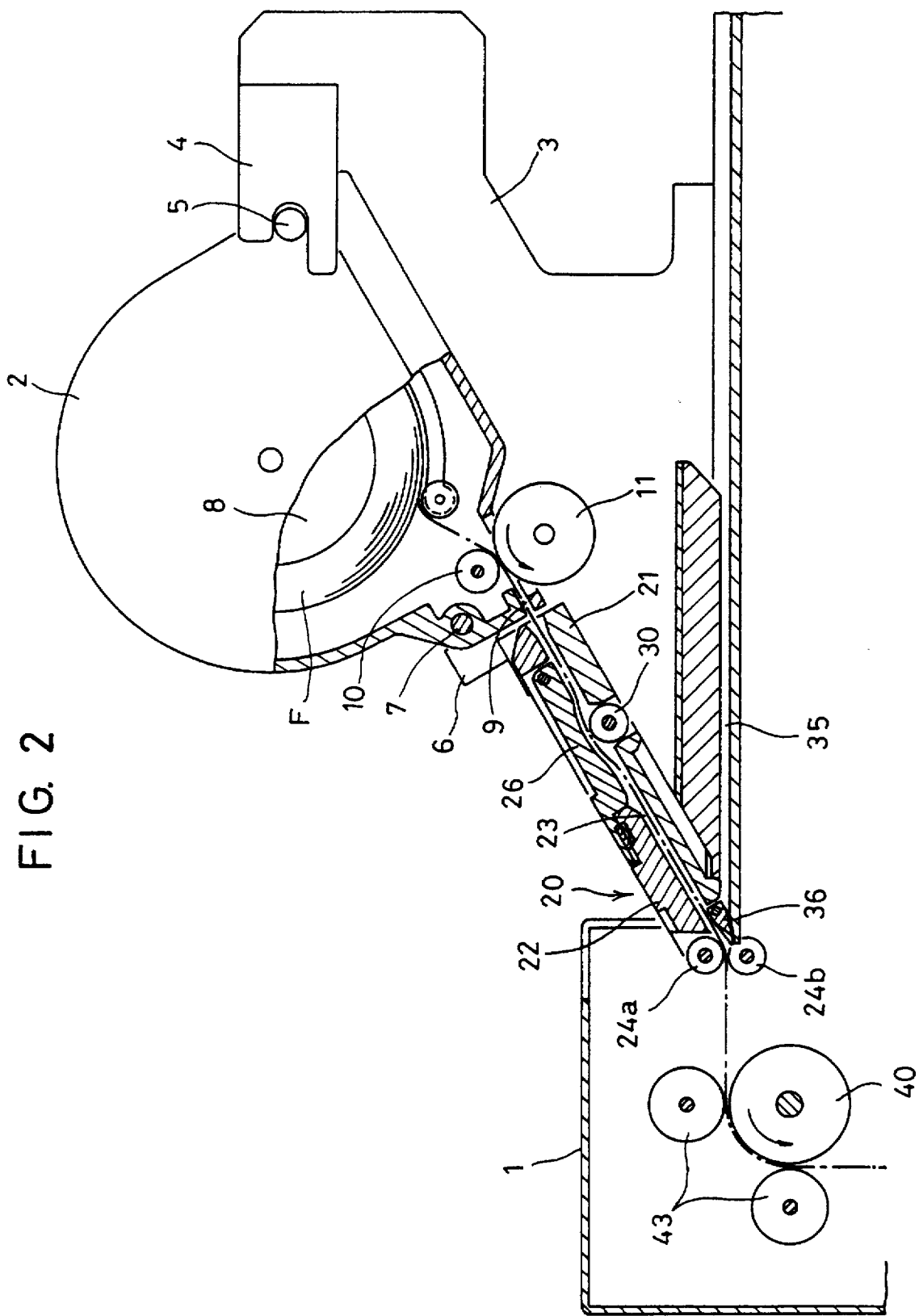
FIG. 2 is a sectional view of a mounting portion for the film magazine.
Figure 3:
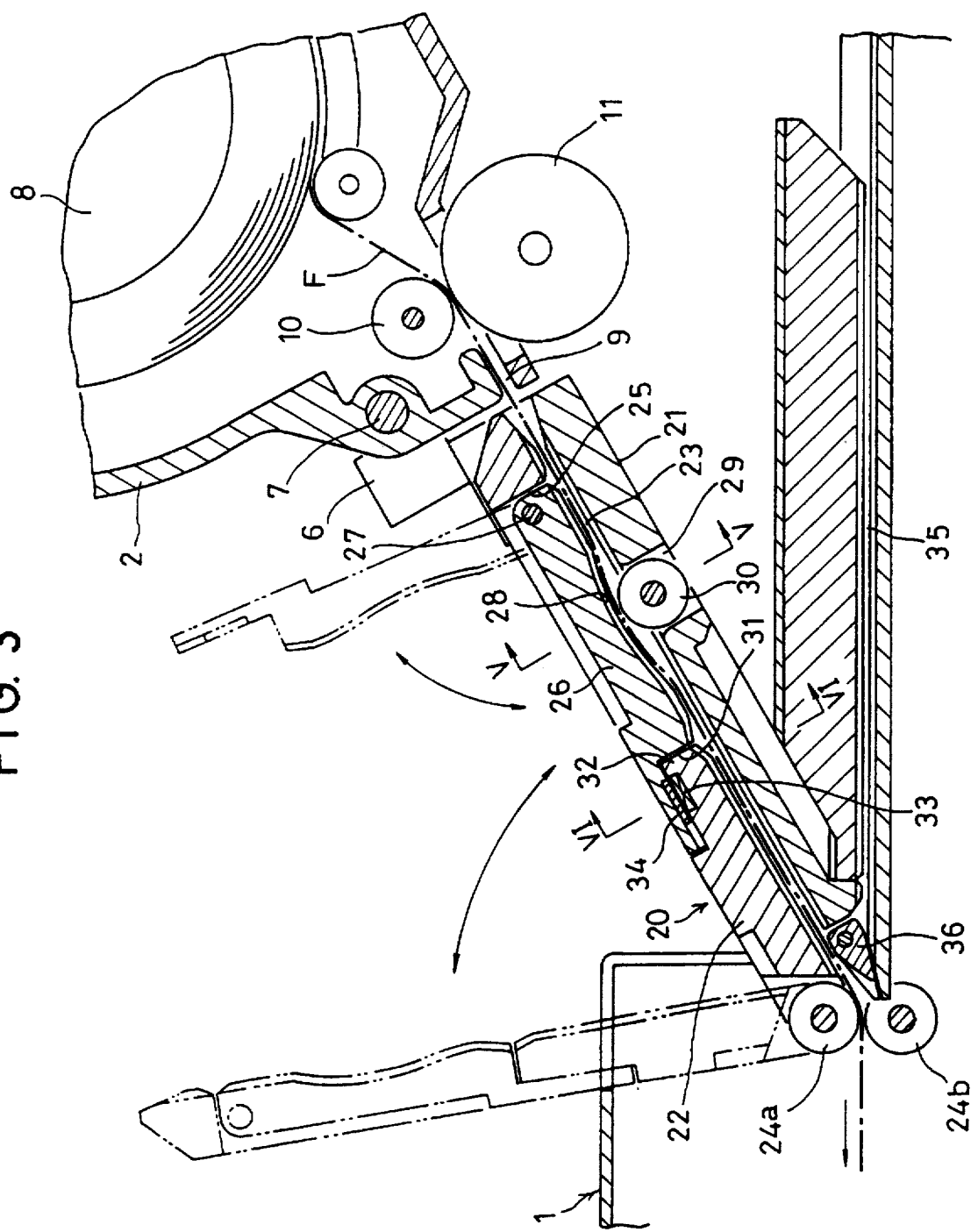
FIG. 3 is an enlarged sectional view of the same portion.
Figure 4:
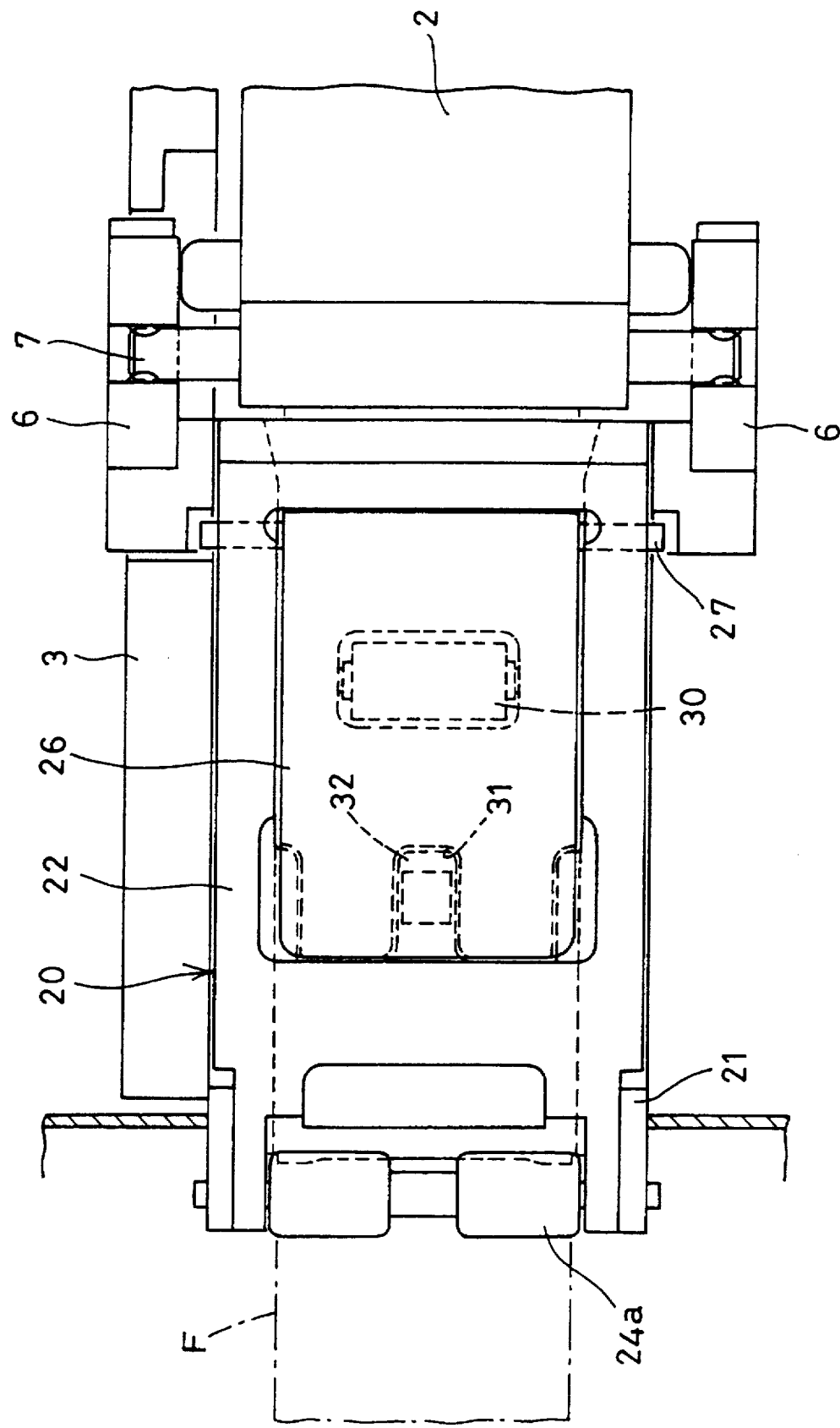
FIG. 4 is a plan view of the portion shown in FIG. 3.
Figure 5:
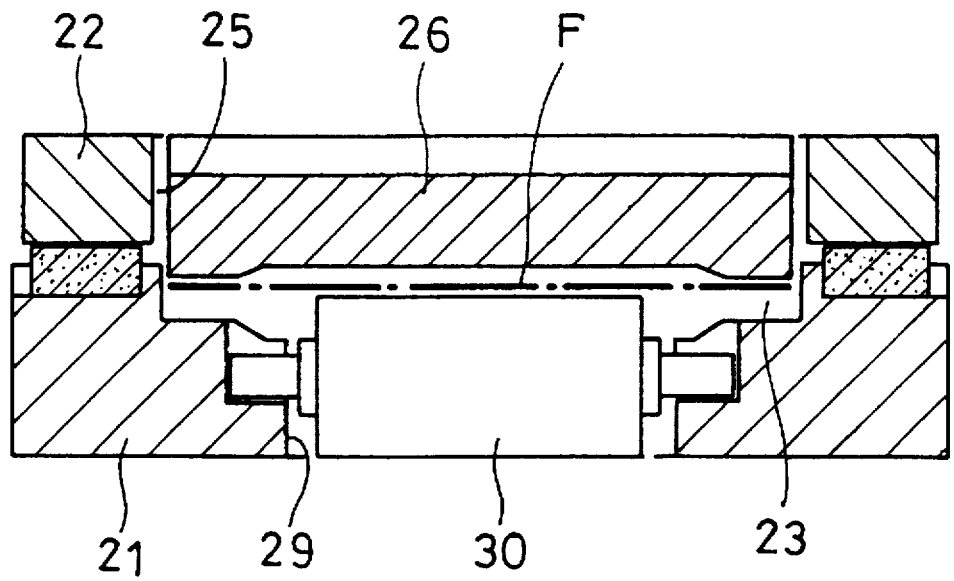
FIG. 5 is a sectional view taken along line V—V of FIG. 3.
Figure 6:
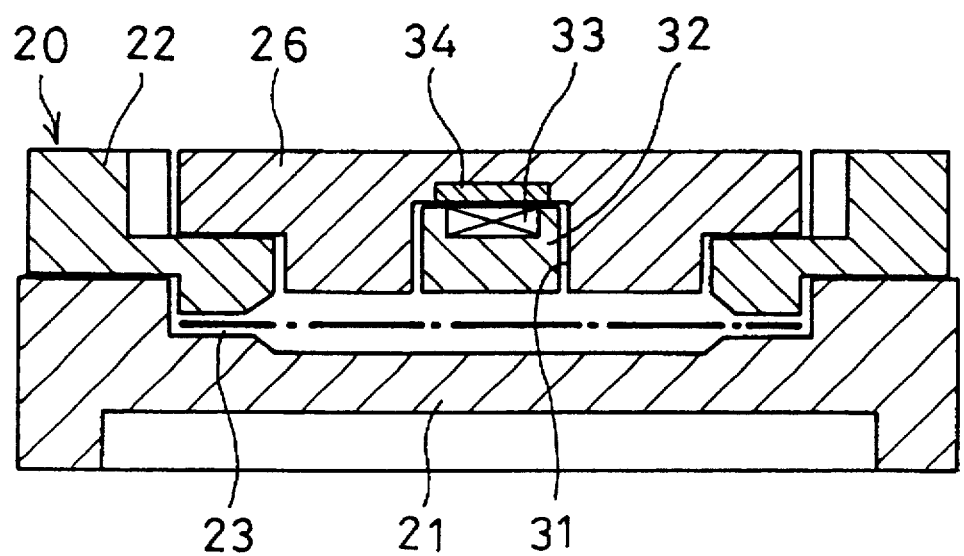
FIG. 6 is a sectional view taken along line VI—VI of FIG. 3.

FIGS. 2 and 3 show a mounting portion for the film magazine 2. It includes a bracket 3 mounted on the top surface of the outer case 1. The bracket 3 has pin supports 4 at rear top end thereof. The film magazine 2 has support pins 5 at the rear end on both sides. They are detachably supported on the pin supports 4.

The film guide 20 is mounted on the bracket 3. A pair of pin supports 6 are provided on both sides of the film guide 20 near its rear end. Front support pins 7 provided on both sides of the film magazine 2 near its front end are detachably supported on the pin supports 6.

The film magazine 2 has a core 8 around which a plurality of films F are wound. Films F are wound so that the leading end of each film is put under the tail end of the preceding film.

With this arrangement, by pulling one film F completely out of the film magazine 2 through a front film outlet 9 provided in the front side of the film magazine 2, the leading end of the subsequent film will be automatically pulled out. Thus, the films in the magazine can be automatically pulled out of the magazine one after another.

Inside the film magazine 2 near the film outlet 9, a guide roller 10 is rotatably mounted. With the film magazine 2 mounted in position, with the rear support pins 5 and the front support pins 7 of the film magazine 2 supported on the respective pin supports 4 and 6, the guide roller 10 is pressed against the top of a feed roller 11 provided under the film magazine 2.

The feed roller 11 is rotated by an unillustrated motor in the direction of the arrow shown in FIG. 2 to feed the film F sandwiched between the rollers 10 and 11 toward the film outlet 9.

The film guide 20 is mounted inclining downward toward its front end. It is made up of a lower guide plate 21 mounted on the bracket 3, and an upper guide plate 22 mounted over the lower one 21. Between the guide plates 21 and 22 is defined a film passage 23 through which films F are fed.

A pair of guide rollers 24a, 24b are provided at the exit of the film passage 23. The upper guide plate 22 is supported so as to be pivotable about the axis of the upper guide roller 24a.

Thus, if films F get stuck in the film passage 23, they can be removed simply by opening the film passage 23 by pivoting the upper guide plate 22 to its upright position about the axis of the upper guide roller 24a.

The upper guide plate 22 has a window 25 in which is fitted a loop guide 26. Its rear end, with respect to the film feed direction, is rotatably supported on the upper guide plate 22 by means of a pin 27.

A smoothly curved concave surface 28 is formed in the inner surface of the loop guide 26. On the other hand, the lower guide plate 21 has a roller mounting hole 29 at a position opposite to the curved surface 28. A loop guide roller 30 is rotatably mounted in the roller mounting hole 29.

The loop guide roller 30 has its upper periphery protruding into the film passage 23, so that the film F fed into the film passage 23 is guided along the curved surface 28 by the loop guide roller 30.

Also, the loop guide 26 has a recess 31 in the bottom surface near its front end with respect to the film feed direction. On the other hand, a projection 32 is provided on the inner edge of the window 25. It protrudes into the recess 31.

One of the mutually opposite surfaces of the projection 32 and recess 31 supports a magnet 33 and the other supports a metal piece 34. Since the metal piece 34 is attracted to the magnet 33, the loop guide 26 will not open by itself even if a film having a strong curling tendency is fed into the film passage 23.

The metal piece 34 may be replaced by a magnet having a polarity opposite to the of the magnet 33.

An interrupt passage 35 branches from the film passage 23 at the front end thereof with respect to the film feed direction. A guide piece 36 is pivotally mounted at the branch point.

The guide piece 36 serves to guide a film F fed into one of the film passage 23 and the interrupt passage 35 into the film feed path inside the outer case 1.

By rotating the feed roller 11 after setting the film magazine 2 in position outside the outer case 1 with the leading end of the outermost film F in the film magazine 2 sandwiched between the guide roller 10 and feed roller 11, the film F is fed through the film passage 23 into the film feed path in the outer case 1.

The film F fed into the film feed path is fed by the first carrier roller 40 and second carrier roller 41 to the scanner unit 44 where the image information is detected frame by frame. After such detection, the film F is sent into the exposure unit 45 for printing.

Since the image information detection in the scanner unit 44 is carried out more quickly than the printing in the exposure unit 45, the film is looped between the scanner unit 44 and the exposure unit 45 as shown by a chain line in FIG. 1.

Since films are wound around the core 8 of the film magazine with the leading end of each film F slipped under the tail end of the inner film, the films F in the next film magazine 2 can be fed one after another into the outer case 1 for image detection and printing.

The scanner unit 44 reads frame-by-frame image information of each film. But there may exist a frame in a film of which the image information is not readable. Positioning of such a frame at the scanner unit 44 is impossible. In such a case, after deactivating the first carrier roller 40 and the second one 41, they are manually rotated in reverse to feed the film F backward by a predetermined distance. Then, the film F is fed forward again for exact positioning of the frame.

Figure 7:
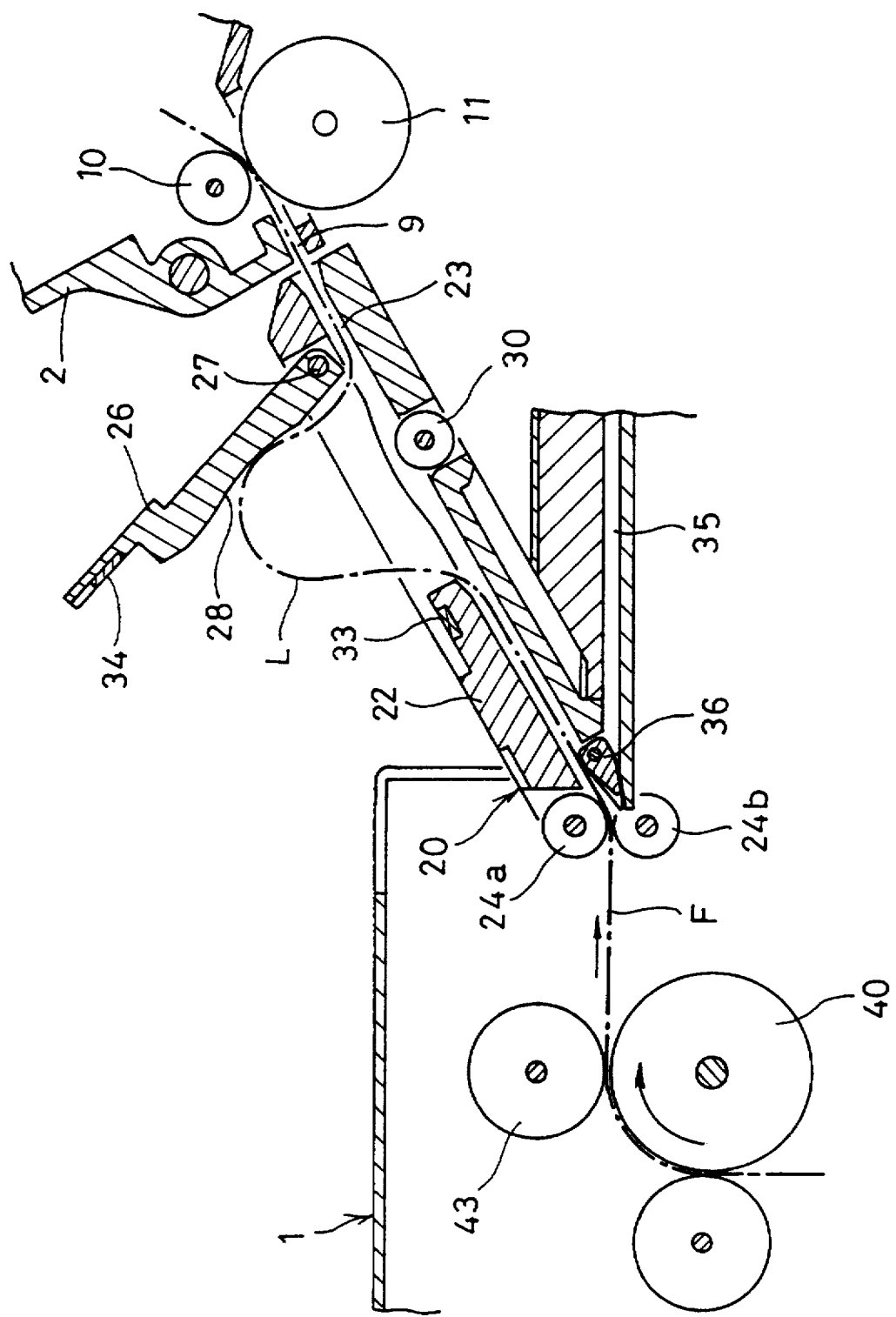
FIG. 7 a sectional view showing how the film is being fed backward.

By feeding the film F backward with its rear end sandwiched between the guide roller 10 and the feed roller 11, the film F will slacken at the portion along the curved surface 28 of the loop guide 26 because the feed roller 11 is not rotating at such time. The more the film is moved backward, the more conspicuously the film will slacken at this portion, so that eventually the film F will push and open the loop guide 26, forming a loop L as shown in FIG. 7.

Namely, the film can be fed backward by a predetermined distance by forming the loop L by forcibly opening the loop guide 26 of the film guide 20. Thus, any frame of the film which could not be positioned at the scanner unit 44 can be repositioned at the scanner unit 44 by manually pulling the film back and feeding it forward again.

If the film is fed backward with its rear end not caught between the guide roller 10 and feed roller 11, the film will be fed backward without slackening or forming a loop. In such a case, too, it is possible to reposition any frame whose image information could not be read in the scanner unit 44.

If it is desired to print an extra film F while the plurality of films fed from the film magazine 2 are being printed continuously, the feed roller 11 is deactivated the moment the leading end of one film fed from the film magazine 2 is caught between the guide roller 10 and the feed roller 11. Then, after the rear end of the film F preceding said one film has left the film passage 23, the extra film F is fed through the interrupt passage 35 into the film feed path.

As described above, according to this invention, the loop guide in the film guide can be opened by the film, so that the film can be fed backward in the feeder for repositioning of any frame which was not detectable in the scanner unit.

The guide plate is pivotable about its front end with respect to the film feed direction. Thus, film passage can be opened easily by pivoting the guide plate upward. Thus any film that may get stuck in the film passage can be easily removed. This makes easy the maintenance of the feeder.

An interrupt passage branches from the film passage. Thus, it is possible to print any extra film while printing the succession of films fed from the film magazine by inserting such an extra film through the interrupt passage.

What is claimed is:

1. An automatic film feeder comprising a film magazine detachably mounted on an outer case of a printing machine and having a core around which a plurality of films are to be wound, a feed roller for feeding the plurality of films out of said film magazine one by one, a film guide for guiding films fed out of said film magazine into a film feed path provided inside said outer case, and carrier rollers for feeding films fed into said film feed path to a scanner unit and then to an exposure unit, said film guide having a loop guide adapted to be opened by being pushed by a slackened portion of a film which is formed when the film is fed backward.

2. An automatic film feeder as claimed in claim 1 wherein said film guide comprises a lower guide plate and an upper guide plate provided over said lower guide plate so as to define a film passage between said upper and lower guide plates, said upper guide plate being formed with a window, said loop guide being mounted in said window, said loop guide having a rear end, with respect to the direction in which films are fed, that is pivotally supported.

3. An automatic film feeder as claimed in claim 2 wherein said upper guide plate has a front end, with respect to the direction in which films are fed, that is pivotally supported.

4. An automatic film feeder as claimed in claim 2 wherein said loop guide has in an inner surface thereof a concavely curved surface, and wherein said lower guide plate rotatably carries a loop guide roller located opposite to said curved surface with part of its outer periphery protruding into said film passage.

5. An automatic film feeder as claimed in claim 1 further comprising an interrupt passage which branches from said film passage at a point where said film guide connects to said film feed path provided in said outer case.

6. An automatic film feeder as claimed in claim 2 wherein a magnet is mounted on one of said upper guide plate and said loop guide and a metal piece is mounted on the other, so that said loop guide will be attracted to said upper guide plate at a leading end of said loop guide.

7. An automatic film feeder as claimed in claim 3 wherein said loop guide has in an inner surface thereof a concavely curved surface, and wherein said lower guide plate rotatably carries a loop guide roller located opposite to said curved surface with part of its outer periphery protruding into said film passage.

8. An automatic film feeder as claimed in claim 2 further comprising an interrupt passage which branches from said film passage at a point where said film guide connects to said film feed path provided in said outer case.

9. An automatic film feeder as claimed in claim 3 further comprising an interrupt passage which branches from said film passage at a point where said film guide connects to said film feed path provided in said outer case.

10. An automatic film feeder as claimed in claim 4 further comprising an interrupt passage which branches from said film passage at a point where said film guide connects to said film feed path provided in said outer case.

11. An automatic film feeder as claimed in claim 7 further comprising an interrupt passage which branches from said film passage at a point where said film guide connects to said film feed path provided in said outer case.

12. An automatic film feeder as claimed in claim 3 wherein a magnet is mounted on one of said upper guide plate and said loop guide and a metal piece is mounted on the other, so that said loop guide will be attracted to said upper guide plate at a leading end of said loop guide.

13. An automatic film feeder as claimed in claim 4 wherein a magnet is mounted on one of said upper guide plate and said loop guide and a metal piece is mounted on the other, so that said loop guide will be attracted to said upper guide plate at a leading end of said loop guide.

14. An automatic film feeder as claimed in claim 5 wherein a magnet is mounted on one of said upper guide plate and said loop guide and a metal piece is mounted on the other, so that said loop guide will be attracted to said upper guide plate at a leading end of said loop guide.

15. An automatic film feeder as claimed in claim 7 wherein a magnet is mounted on one of said upper guide plate and said loop guide and a metal piece is mounted on the other, so that said loop guide will be attracted to said upper guide plate at leading end of said loop guide.

16. An automatic film feeder as claimed in claim 8 wherein a magnet is mounted on one of said upper guide plate and said loop guide and a metal piece is mounted on the other, so that said loop guide will be attracted to said upper guide plate at a leading end of said loop guide.

17. An automatic film feeder as claimed in claim 9 wherein a magnet is mounted on one of said upper guide plate and said loop guide and a metal piece is mounted on the other, so that said loop guide will be attracted to said upper guide plate at a leading end of said loop guide.

18. An automatic film feeder as claimed in claim 10 wherein a magnet is mounted on one of said upper guide plate and said loop-guide and a metal piece is mounted on the other, so that said loop guide will be attracted to said upper guide plate at a leading end of said loop guide.

19. An automatic film feeder as claimed in claim 11 wherein a magnet is mounted on one of said upper guide plate and said loop guide and a metal piece is mounted on the other, so that said loop guide will be attracted to said upper guide plate at a leading end of said loop guide.

* * * * *